United States Patent
Moncomble (10) Patent No.: US 9,203,966 B2
(45) Date of Patent: Dec. 1, 2015

(54) METHOD AND DEVICE FOR MODIFYING A COMPOUNDED VOICE MESSAGE

(71) Applicant: France Telecom, Paris (FR)

(72) Inventor: Ghislain Moncomble, Lannion (FR)

(73) Assignee: FRANCE TELECOM, Paris (FR)

( * ) Notice: Subject to any disclaimer, the term of this patent is extended or adjusted under 35 U.S.C. 154(b) by 426 days.

(21) Appl. No.: 13/627,106

(22) Filed: Sep. 26, 2012

(65) Prior Publication Data

US 2013/0085748 A1    Apr. 4, 2013

(30) Foreign Application Priority Data

Sep. 29, 2011   (FR) ...................................... 11 58754

(51) Int. Cl.
*H04M 11/00* (2006.01)
*H04M 3/533* (2006.01)

(52) U.S. Cl.
CPC .. *H04M 3/53366* (2013.01); *H04M 2203/4554* (2013.01)

(58) Field of Classification Search
CPC ...... G10L 25/48; H04M 3/493; H04M 3/533; H04M 3/53341; H04M 3/53366
USPC ................. 704/270, 235; 379/88.18
See application file for complete search history.

(56) References Cited

U.S. PATENT DOCUMENTS

| | | | |
|---|---|---|---|
| 4,779,209 A * | 10/1988 | Stapleford et al. ............ | 704/278 |
| 5,146,487 A | 9/1992 | Bergsman et al. | |
| 6,507,643 B1 * | 1/2003 | Groner ........................ | 379/88.14 |
| 7,212,614 B1 | 5/2007 | Burg et al | |
| 7,899,161 B2 * | 3/2011 | Katkam et al. ............. | 379/88.13 |
| 2002/0090067 A1 * | 7/2002 | Forrest ........................ | 379/88.12 |
| 2004/0008827 A1 * | 1/2004 | Martin et al. ................ | 379/67.1 |
| 2004/0042595 A1 * | 3/2004 | Davis et al. ................. | 379/88.22 |
| 2005/0037739 A1 * | 2/2005 | Zhong ........................... | 455/413 |
| 2005/0086316 A1 * | 4/2005 | Chen ............................. | 709/207 |
| 2005/0136896 A1 * | 6/2005 | Ward et al. .................... | 455/413 |

(Continued)

FOREIGN PATENT DOCUMENTS

| | | |
|---|---|---|
| EP | 1117242 A2 | 7/2001 |
| WO | 02054803 A1 | 7/2002 |
| WO | 2007058522 A1 | 5/2007 |

OTHER PUBLICATIONS

French Search Report and Written Opinion dated May 11, 2012 for corresponding French Application No. 1158754, filed Sep. 29, 2011.

(Continued)

*Primary Examiner* — Shaun Roberts
(74) *Attorney, Agent, or Firm* — David D. Brush; Westman, Champlin & Koehler, P.A.

(57) ABSTRACT

A method and device are provided for modifying a compounded voice message having at least one first voice component. The method includes a step of obtaining at least one second voice component, a step of updating at least one item of information belonging to a group of items of information associated with the compounded voice message as a function of the at least one second voice component and a step of making available the compounded voice message comprising the at least one first and second voice components, and the group of items of information associated with the compounded voice message. The compounded voice message is intended to be consulted by at least one recipient user.

16 Claims, 3 Drawing Sheets

(56) References Cited

U.S. PATENT DOCUMENTS

| | | | |
|---|---|---|---|
| 2007/0244700 A1* | 10/2007 | Kahn et al. | 704/235 |
| 2010/0080365 A1* | 4/2010 | Seetharaman et al. | 379/88.22 |

OTHER PUBLICATIONS

French Search Report and Written Opinion dated May 22, 2012 for corresponding French Application No. 1158751, filed Sep. 29, 2011.

* cited by examiner

METHOD AND DEVICE FOR MODIFYING A COMPOUNDED VOICE MESSAGE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure lies in the field of voice messaging. It relates to a method and a device for modifying a compounded voice message.

BACKGROUND OF THE DISCLOSURE

A voice messaging service allows a caller to leave a voice message destined for a called party on a messaging server. The called party can thereafter consult either vocally, or visually, the voice messages which have been sent to him. Today, the possible interactions for a called party on a voice message left by a caller are limited.

Document US20040042595 A1 proposes a method allowing a caller who has left a voice message on the messaging facility of a called party to modify the voice message previously left if the caller has an identifier of the voice message left.

Document EP1117242 A2 proposes a method allowing a called party to send a caller a voice response to a voice message left by the caller.

DRAWBACK OF THE PRIOR ART

A recipient of a voice message which has been modified by one or more senders only has the information contained in the voice message spoken by the sender.

Moreover, the recipient cannot easily identify, nor listen to or act separately on the voice components of the voice message corresponding to one or more particular senders.

SUMMARY

An illustrative embodiment of the present disclosure makes exemplary improvements with respect to the prior art. It proposes for this purpose a method of modifying a compounded voice message comprising at least one first voice component. The method comprises a step of obtaining at least one second voice component, a step of updating at least one item of information belonging to a group of items of information associated with the compounded voice message as a function of the at least one second voice component, and a step of making available the compounded voice message comprising the at least one first and second voice components, and the group of items of information associated with the compounded voice message. The compounded voice message is intended to be consulted by at least one recipient user.

Here, the term voice component is understood to mean a voice component sent or articulated by a user or else an audio component corresponding to an audio stream such as for example a musical stream.

Thus, it is possible for a user to add a voice component to an existing voice message. For example, the user can respond to at least one sender of the voice message, at any position in the voice message.

The automatically updated items of information associated with the voice message are then available for a subsequent consultation of the voice message and/or of the items of information associated with the voice message, by the recipient of the voice message.

A recipient of the modified voice message may thus obtain information relating to the diffrentes modifications brought to the voice message.

The various modes or characteristics of embodiment mentioned hereinafter may be added independently or in combination with one another, to the steps of the method of modifying a compounded voice message defined hereinabove.

According to a particular embodiment of the disclosure, the group of items of information associated with the compounded voice message comprises at least one first, respectively one second, item of information associated with the at least one first, respectively second, voice component.

The item of information associated with a voice component can for example belong to a group comprising an item of information of position of the voice component in the compounded voice message, an item of information of duration of the voice component, at least one item of information relating to the sender user who emitted the voice component, the textual transcription of the voice component, or a time-stamping item of information relating to the voice component.

Thus, the recipient has items of information relating to each of the voice components of the message.

According to another particular embodiment of the disclosure, the method of modifying a compounded voice message comprises a step of editing a global voice message by concatenating the at least one first and second voice components as a function of at least one item of information of the group of items of information associated with the compounded voice message.

The voice components of the voice message can then be listened to by the recipient in the form of a single audio sequence, for example if the recipient's terminal is a basic terminal, not having any functionality for viewing the voice message.

According to another particular embodiment of the disclosure, the step of editing the global voice message is performed subsequent to the receipt of a request to consult the compounded voice message originating from the recipient user. The audio editing resources are thus used only if necessary.

According to another particular embodiment of the disclosure, the second voice component is a predefined voice component belonging to a group comprising a silence, a musical audio stream chosen as a function of the at least one recipient user, an advertising audio stream.

Further voice components can thus be added between the voice components of the senders of the voice message so as to facilitate the transition between the voice components of the senders for example, or to render the voice message more attractive during listening by the recipient.

The disclosure also relates to a method of consultation by a recipient user of a compounded voice message comprising at least one first and one second voice component and a group of items of information associated with the compounded voice message. The method of consultation comprises the steps of reception of at least one first voice component of the compounded voice message and the group of items of information associated with the compounded voice message and of restoration in a visual and/or voice form of the at least one first voice component as a function of the group of items of information associated with the compounded voice message.

The recipient of the voice message thus has a visual representation of the voice message. The recipient can easily identify and select the voice components of the message that he wishes to listen to.

The various modes or characteristics of embodiment mentioned hereinafter may be added independently or in combination with one another, to the steps of the method of consulting a compounded voice message defined hereinabove.

According to another particular embodiment of the disclosure, the method of consulting a compounded voice message comprises a step of visual restoration of at least one item of information belonging to the group of items of information associated with the compounded voice message, the at least one item of information being associated with a voice component of the compounded voice message.

The recipient of the voice message has for example access to items of information relating to the senders of the voice components of the message.

According to another particular embodiment of the disclosure, the method of consulting a compounded voice message comprises a step of displaying at least one action that can be executed, the action being defined as a function of at least one item of information associated with a voice component restored and belonging to the group of items of information associated with the compounded voice message.

The recipient of the voice message can thus choose to respond to one of the senders of the voice message for example or transfer the voice message to another recipient.

The disclosure also relates to a method of editing a global voice message on the basis of a compounded voice message comprising at least one first and second voice components and a group of items of information associated with the compounded voice message. The editing method comprises a step of reading the at least one first and second stored voice components and at least one item of information of the group of items of information associated with the compounded voice message, and a step of concatenating the at least one first and second voice components as a function of the at least one item of information read from the group of items of information associated with the compounded voice message.

The group of items of information thus makes it possible to perform the audio editing of the voice components of the message into a single audio sequence.

The various modes or characteristics of embodiment mentioned hereinafter may be added independently or in combination with one another, to the steps of the method of editing a global voice message defined hereinabove.

According to another particular embodiment of the disclosure, the method of modifying a compounded voice message comprises a step of inserting at least one synthesized voice component corresponding to at least one item of information belonging to the group of items of information associated with the compounded voice message and associated with the at least one first or second voice component.

The recipient of the voice message thus has a voice restoration of an item of information associated with a voice component of the voice message.

The various modes or characteristics of embodiment mentioned hereinabove with reference to the method of consulting a compounded voice message may be added independently or in combination with one another, to the steps of the method of modifying a compounded voice message defined hereinabove.

The various modes or characteristics of embodiment mentioned hereinabove with reference to the method of editing a global voice message may be added independently or in combination with one another, to the steps of the method of modifying a compounded voice message defined hereinabove.

The disclosure also relates to a device for modifying a compounded voice message comprising at least one first voice component. The modification device comprises means for obtaining at least one second voice component, means for updating at least one item of information belonging to a group of items of information associated with the compounded voice message as a function of the at least one second voice component, and means for making available the compounded voice message comprising the at least one first and second voice components, and the group of items of information associated with the compounded voice message.

The disclosure also relates to a terminal comprising a modification device such as cited hereinabove.

The disclosure also relates to a server comprising a modification device such as cited hereinabove.

The disclosure also relates to a device for consulting a compounded voice message comprising at least one first and one second voice component and a group of items of information associated with the compounded voice message. The consultation device comprises means for receiving at least one first voice component of the compounded voice message and the group of items of information associated with the compounded voice message, and means for restoring in a visual and/or voice form the at least one first voice component as a function of the group of items of information associated with the compounded voice message.

The disclosure also relates to a terminal comprising a consultation device such as cited hereinabove.

The disclosure also relates to a terminal comprising a modification device and a consultation device such as are cited hereinabove.

The disclosure also relates to a device for editing a global voice message on the basis of a compounded voice message comprising at least one first and second voice components and a group of items of information associated with the compounded voice message. The editing device comprises means for reading the at least one first and second stored voice components and at least one item of information of the group of items of information associated with the compounded voice message, and means for concatenating the at least one first and second voice components as a function of the at least one item of information read from the group of items of information associated with the compounded voice message.

The disclosure also relates to a server comprising an editing device such as cited hereinabove.

The disclosure also relates to a server comprising a modification device and an editing device such as are cited hereinabove.

The disclosure also relates to a computer program comprising instructions for the execution of the method of modifying a compounded voice message according to any one of the particular embodiments of the disclosure, when the program is executed by a processor.

The disclosure also relates to a computer program comprising instructions for the execution of the method of consulting a compounded voice message according to any one of the particular embodiments of the disclosure, when the program is executed by a processor.

The disclosure also relates to a computer program comprising instructions for the execution of the method of editing a global voice message according to any one of the particular embodiments of the disclosure, when the program is executed by a processor. The disclosure also relates to a recording medium readable by a processor on which is recorded a program comprising instructions for the execution of the method of modifying a compounded voice message according to any one of the particular embodiments of the disclosure.

The disclosure also relates to a recording medium readable by a processor on which is recorded a program comprising instructions for the execution of the method of consulting a compounded voice message according to any one of the particular embodiments of the disclosure.

The disclosure also relates to a recording medium readable by a processor on which is recorded a program comprising instructions for the execution of the method of editing a global voice message according to any one of the particular embodiments of the disclosure.

BRIEF DESCRIPTION OF THE DRAWINGS

Other advantages and characteristics will be more clearly apparent on reading the following description of a particular embodiment of the disclosure, given by way of simple illustrative and nonlimiting example, and the appended drawings, among which.

DETAILED DESCRIPTION OF ILLUSTRATIVE EMBODIMENTS

One or more embodiments of the present disclosure allows the consultation and the modification of a compounded voice message composed of at least one voice component sent by at least one sender user.

The method of modifying a compounded voice message allows a recipient user of an initial voice message to modify the initial voice message received so as to add a further voice component to the initial voice message. The recipient of the initial voice message then becomes a sender of the resulting compounded voice message.

The initial voice message may be a voice message comprising only one voice component sent by a single sender user. The initial voice message can also be a compounded voice message comprising more than one voice component sent by one or more different sender users.

The compounded voice message comprises at least one voice component and is associated with a group of items of information. The group of items of information associated with the compounded voice message can for example comprise data associated with a voice component of the compounded voice message. These data can for example be an item of information of position of the voice component in the compounded voice message, an item of information of duration of the voice component, an item of information for time-stamping the creation and/or the last modification of the voice component, an item of information relating to the sender user who emitted the voice component for example an identity, a contact address or a telephone number, a location.

The group of items of information can also comprise global data relating to the compounded voice message. For example, these data can correspond to a log of the modifications performed on the compounded voice message.

The disclosure relates to a method of modifying a compounded voice message composed of at least one voice component and a group of items of information associated with the voice message.

The steps of the method of modifying a compounded voice message according to a particular embodiment of the disclosure are illustrated with reference to FIG. 1.

In the embodiment described hereinbelow, the method of modifying a voice message is implemented by the terminal of a user. According to this embodiment, the user's terminal has means for displaying the voice messages that it receives.

According to this embodiment, the method of modifying a voice message comprises a step 10 (RMSG1) of receiving a voice message and a group of items of information associated with the voice message.

The information group associated with the voice message received comprises at least one time-stamping item of information relating to the creation of the voice message. The information group can also comprise other items of information such as that described hereinabove. The voice message received may be a voice message arising from a single sender and unmodified. The voice message received can also be a compounded voice message comprising at least two voice components arising from one or more senders.

After listening to the voice message, the user can decide to insert one or more voice components into the voice message received so as to supplement it or to respond to the sender user or to the sender users who emitted the voice message.

Figure 8A:
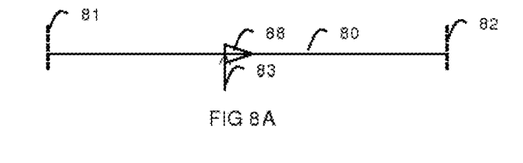
FIGS. 8A and 8B represent in a schematic manner a compounded voice message according to a particular embodiment of the disclosure.

The user selects the position at which he wishes to insert the new voice component, via for example the selection of a position on a time line representing the voice message, as represented by FIG. 8A described further on.

FIG. 8A illustrates a visual representation of a voice message by a time line. A cursor 88 advances along the time line in tandem with the reading of the voice message. In this example, the voice message comprises only one voice component 80, the start of which is identified by a time-marking datum 81 and the end of which is identified by the end of the global voice message 82. The voice component 80 can also be identified by a start time-marking datum 81 and a duration in seconds.

The position for inserting a voice component selected by the user is indicated by an arrow 83 pointing at a temporal instant of the time line.

The user's terminal then determines the temporal position in the voice message on the basis of the position selected by the user, for example the number of seconds in relation to the start of the voice message.

Figure 1:
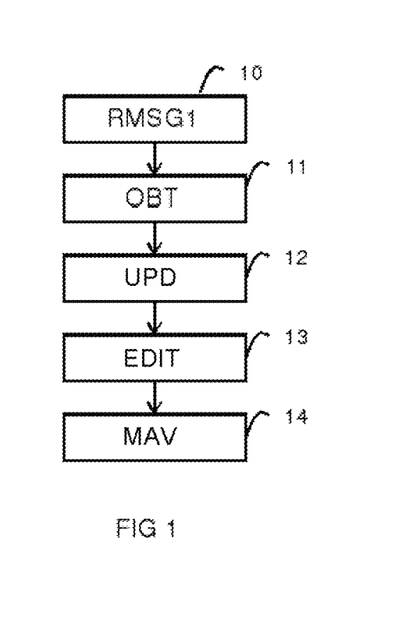
FIG. 1 illustrates steps of the method of modifying a compounded voice message according to a particular embodiment of the disclosure.

Next, the user's terminal acquires the new voice component by the recording via the microphone of the terminal of the user's voice during a step 11 (OBT) with reference to FIG. 1.

When the user indicates the end of the recording of the new voice component, the terminal records the new voice component.

During a step 12 (UPD), the terminal then updates the group of items of information associated with the voice message.

The terminal updates notably the item of information of total duration of the voice message so as to add the duration of the new voice component. The terminal also updates the position items of information associated with the voice components of the voice message in relation to the position for inserting the new voice component, notably the rank of the voice component and the time-marking data indicating the start of the voice component. When a voice component is inserted inside a pre-existing voice component, the pre-existing voice component is cut into two voice sub-components and the time-marking data associated with these two voice sub-components are created and/or updated in relation to the position of the new voice component.

Figure 8B:
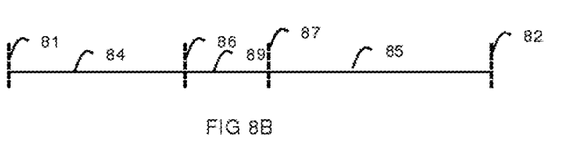

FIG. 8B illustrates the updating of the items of information associated with the voice message. Subsequent to the insertion of a new voice component 89, the initial voice component 80 is cut into two voice components 84 and 85. New time-marking data are inserted at the start 86 of the new voice component 89, and at the start 87 of the second part of the initial voice component 80.

The terminal can also update the items of information relating to the sender of the new voice component and for example obtain location items of information via the geo-location of its terminal.

With reference to FIG. 1, according to a particular embodiment of the disclosure, the terminal can create the group of items of information associated with the voice message if these items of information did not exist for the voice message initially received in step 10. The terminal then determines and stores items of information relating to each voice component of the voice message, for example the duration in seconds of the voice component, the coordinates of the sender of this voice component if they are available, the time-stamp of initial leaving of the message. Other items of information may be created such as items of information relating to the voice component itself, for example the corresponding text if a transcription with the aid of a voice recognition functionality is implemented, or if the voice component has been generated on the basis of text with the aid of a voice synthesis.

All or some of these items of information may be inserted into the group of items of information associated with the voice message.

According to a particular embodiment of the disclosure, the user's terminal can perform the audio editing of the voice message during a step 13 (EDIT) by concatenating the voice components of the voice message as a function of the items of information of the group of items of information associated with the voice message so as to obtain a single audio sequence comprising the voice components.

According to another particular embodiment of the disclosure, the editing step can also correspond to video editing. For example, the user can select a video, a group of photos that the terminal inserts with the voice component into the voice message. The recipient can then view the inserted movie while also listening to the added voice component.

During a step 14 (MAV), the terminal makes available the voice message comprising the voice components of the voice message received and the new voice component as well as the group of items of information associated with the updated voice message. The voice message thus modified is made available to at least one recipient user for example by saving on a server interrogatable by the recipient.

As a variant of this particular embodiment of the disclosure, the user's terminal can insert a component such as a silence or a piece of music for example, between the voice components during editing. Subsequent to this insertion, the group of items of information associated with the voice message is then updated in a similar manner as in step 12. According to another particular embodiment of the disclosure, the method of modifying a voice message may be implemented by a server remote from the user's terminal. This embodiment is particularly advantageous when the user's terminal does not support the method of modifying a voice message.

According to this embodiment, the method of modifying a voice message comprises a step 10 (RMSG1) of receiving a voice message and the group of items of information associated with the voice message by the remote server.

In parallel, the user's terminal receives the voice message and restores visually and/or vocally the voice message to the user. When the user selects the position for inserting a new voice component into the voice message via for example the dispatching of a DTMF (for Dual Tone Multiple Frequency) code, the remote server records the voice component sent by the user and the position of the voice component in the voice message, during a step 11.

During a step 12, the server updates the items of information associated with the voice components of the message and the global items of information associated with the voice message.

According to a particular embodiment of the disclosure, the updated information group is dispatched by the remote server to the user's terminal so as to update the restoration of the voice message by the terminal.

According to another particular embodiment of the disclosure, during a step 13 (EDIT), the remote server performs the audio editing of the voice message such as will be described further on with reference to FIG. 3.

According to another particular embodiment of the disclosure, the audio editing step 13 is performed subsequent to the request to consult the voice message originating from the recipient user.

According to the embodiment of the disclosure, the voice message may be stored on a voice messaging server of the recipient in the form of independent audio sequences or in the form of a single audio sequence. The group of items of information can for example be transmitted and stored according to the HTTP (for HyperText Transfer Protocol) protocol. The group of items of information associated with the voice message may be stored on the recipient's voice messaging server or on a distinct server. When it is stored on a data server distinct from the server for storing the voice components, the group of items of information then contains at least one reference to the voice message with which it is associated.

The method of consulting a compounded voice message is described with reference to FIG. 2. The compounded voice message may for example have been created or modified according to the method of modification described with reference to FIG. 1.

The method of consultation comprises a step 20 (REC_VC) of receiving a voice message and the group of items of information associated with the voice message by the terminal of a user.

The voice components of the voice message may be received in the form of independent audio sequences or in the form of a single audio sequence arising from a prior audio editing of the voice components.

According to the embodiment of the disclosure, the voice components may be downloaded completely from a server before being restored or the voice components may be downloaded progressively in parallel with their restoration.

During a step 21 (REST_VC), the user's terminal restores in a visual form the voice message received with the aid of the group of items of information associated with the voice message. The items of information associated with the voice message allow the terminal to determine the order in which to arrange the voice components of the voice message when they are received in the form of independent audio sequences.

The items of information associated with the voice message also make it possible to identify the voice components in the voice message when they are in the form of a single audio sequence.

During the restoration step 21, the user's terminal can for example display the voice message in the form of a time line composed of segments each corresponding to a voice component of the message.

Figure 9:
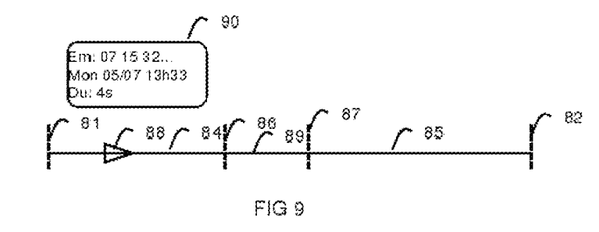
FIG. 9 illustrates an interface for viewing a compounded voice message according to a particular embodiment of the method of consulting a compounded voice message.

For example, with reference to FIG. 9, a voice message comprising three voice components 84, 89 and 85 is displayed. This voice message arises for example from the method of modification as described with reference to FIGS. 1, 8A and 8B. The cursor 88 moves along the time line in tandem with the reading of the voice message and indicates in this example that the voice component currently being read is the voice component 84.

The user can then select the voice component or components of the message that he wishes to listen to or on which he wishes to act.

According to a particular embodiment of the disclosure, the user's terminal can also play the voice components simultaneously with the displaying of the voice components.

Figure 2:
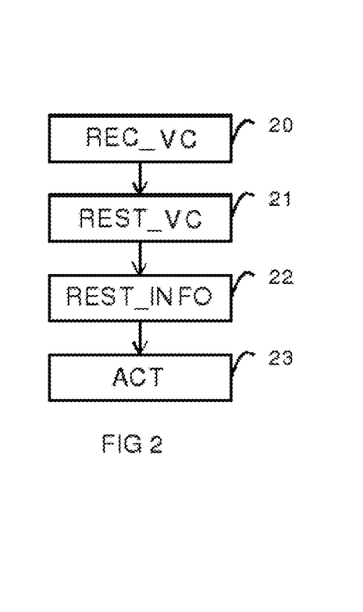
FIG. 2 illustrates steps of the method of consulting a compounded voice message according to a particular embodiment of the disclosure.

With reference to FIG. 2, according to a particular embodiment of the disclosure, during a step 22 (REST_INFO), the user's terminal restores visually at least one datum of the group of items of information associated with the voice message and relating to a voice component. For example, as illustrated in FIG. 9, when the user selects a voice component 84, the data associated with this component 90 are displayed to the user. In this example, the data correspond to the number of the sender Em of the voice component, the duration Du of the voice component and the time-stamp of the voice component.

As a variant, the data or a part of the data associated with a voice component may be displayed at the moment of the voice restoration of the voice component.

Figure 10:
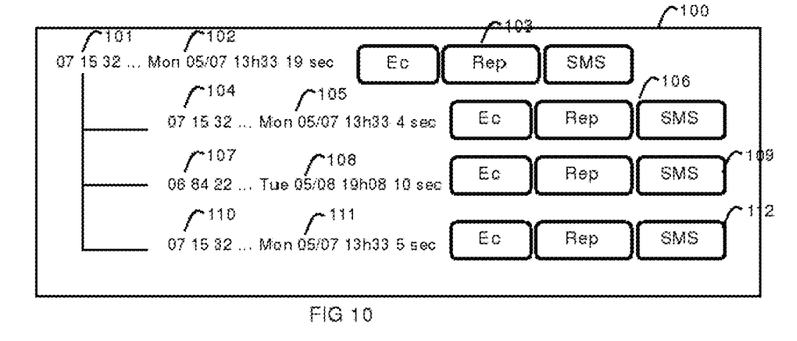
FIG. 10 illustrates an interface for viewing a compounded voice message according to another particular embodiment of the method of consulting a compounded voice message.

As a variant, the terminal can display the voice components of the voice message in the form of a list of independent audio sequences to be played, as illustrated in FIG. 10.

FIG. 10 shows a graphical interface 100 displaying the voice message illustrated in FIG. 9 in the form of a list of independent audio sequences. In this form, the interface displayed to the user comprises global items of information 101 (telephone number of the initial sender of the voice message), 102 (initial time-stamp of the voice message) and 103 (possible actions on the message) associated with the global voice message and items of information associated respectively with each voice component of which the voice message is composed.

The items of information associated with the global voice message or the voice components correspond for example:

to the telephone number of the initial sender of the voice message 101 or of the sender of the voice component 104, 107, 110, to the initial time-stamp of the voice message 102 or to the time-stamp of the voice component 105, 108, 111, to the possible actions on the global message 103 or on the voice component 106, 109, 112, these actions can correspond for example to listening to the audio sequence (Ec), responding to the sender (Rep) or dispatching an SMS to the sender (SMS).

The first voice component associated with the items of information 104, 105 and 106 corresponds to the first part 84 of the initial voice component 80 of the voice message.

The third voice component associated with the items of information 110, 111 and 112 corresponds to the second part 85 of the initial voice component 80 of the voice message.

The second voice component associated with the items of information 107, 108 and 109 corresponds to the voice component inserted 89 into the voice message by the method of modification for example.

The user can select and listen to each voice component independently.

With reference to FIG. 2, according to another particular embodiment of the disclosure, during a step 23 (ACT), the user's terminal displays at least one action that can be executed and defined as a function of at least one item of information associated with a voice component undergoing restoration vocally or selected by the user. The action that can be executed can for example correspond to:

reading the voice component undergoing restoration vocally or selected, responding to the sender user who emitted the voice component, transferring the voice message to the sender user who emitted the voice component, inserting a new voice component before or after the voice component, adding a notification of an event associated with the voice component or with the sender user who emitted the voice component, for example: a notification of deadline for responding to the sender user, saving the voice component in the form of a reproducible audio file, deleting a voice component.

According to another particular embodiment of the disclosure, the user's terminal displays at least one action that can be executed and defined as a function of at least one global item of information associated with the voice message. This action can for example correspond to reading the voice message, responding to all the users having sent a voice component of the voice message, transferring the voice message to a recipient user; saving the voice message.

According to a particular embodiment of the disclosure, the user may for example thereafter decide to insert one or more voice components into the voice message received so as to supplement it or in order to respond to the sender user or to the sender users who emitted the voice message.

Steps 11 and 12 of the method of modification such as described with reference to FIG. 1 are then implemented by the user's terminal.

Subsequent to the updating of the group of items of information associated with the voice message during step 12, the user's terminal can update the voice message visual restoration performed in step 21 so as to display the position and/or the segment corresponding to the new recorded voice component. During a step 14 (MAV), the terminal makes available the voice message comprising the voice components of the voice message received and the new voice component as well as the group of items of information associated with the updated voice message. The voice message thus modified is made available to at least one recipient user. The recipient user may be the sender user who emitted the voice message or the sender users who emitted a voice component of the voice message or else be determined as a function of an action displayed in step 23 and selected by the user.

Figure 3:
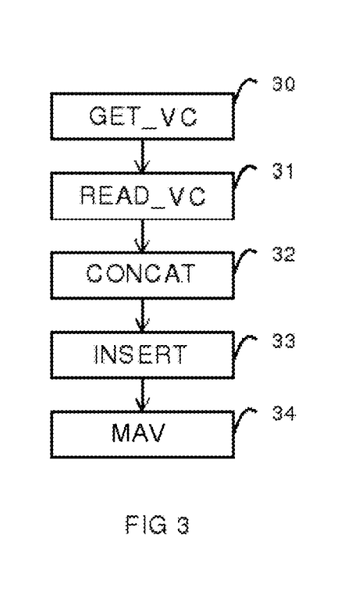
FIG. 3 illustrates steps of the method of editing a global voice message according to a particular embodiment of the disclosure.

FIG. 3 shows the steps of the method of editing a global voice message according to a particular embodiment of the disclosure. The audio editing of the voice message may be performed by the voice messaging server storing the voice message or by a server associated with the voice messaging server. With reference to FIG. 3, when the voice components are stored in the form of independent audio sequences, the server obtains the stored voice components and the group of items of information associated with the voice message during a step 30 (GET_VC). The server reads the items of information associated with the voice components during a step 31 (READ_VC). With the aid of the items of information associated with the voice components, notably the items of information of positions and of duration of the voice components, the server concatenates the voice components during a step 32 (CONCAT).

According to a particular embodiment of the disclosure, during the audio editing, the server inserts during a step 33 (INSERT) between two voice components of the voice message, at least one synthesized voice component corresponding to an item of information associated with the following voice component which will be concatenated. The items of information associated with the voice components can thus be read to the recipient user of the voice message during voice restoration of the message.

Thus, the recipient user has access to these items of information even when these items of information cannot be displayed to him, for example because of the capabilities of his terminal or of a visual deficiency of the recipient user. In this embodiment, a version of the voice components in the form of independent audio sequences is preserved for subsequent use by the recipient on the basis of an advanced terminal, having capabilities to display the compounded voice message such as described in the present disclosure, or if the recipient responds to one of the senders of the message and this sender has an advanced terminal.

The voice message is thereafter made available to the recipient user during a step 34 (MAV) similar to step 14 of FIG. 1.

According to a particular embodiment of the disclosure, the audio editing of the voice message may be performed while the voice components and the group of items of information associated with the voice message are being made available by the terminal of the sender user.

According to another particular embodiment of the disclosure, the audio editing of the voice message may be performed subsequent to the request to consult the voice message originating from the recipient user.

According to another particular embodiment of the disclosure, during the consultation of the voice message by a recipient user for example by the method of consultation such as described with reference to FIG. 2, the voice messaging server or the application server allowing access by the user's terminal to the messaging service implements a step of determining the compatibility of the user's terminal with the functionalities offered by the compounded voice message and notably the capacity of the terminal to process the group of items of information associated with the voice message and the capability to process the voice components independently.

For example, the characteristics of the terminal may be stored on a server, for example at the level of a network address book. The characteristics of the terminal may also have been recorded during a previous use of the voice messaging service, or if the user has installed on his terminal an application necessary for the operation of a voice messaging service proposing the modification of a compounded voice message such as described according to the method of the present disclosure.

According as the terminal is not compatible with the functionalities offered by the compounded voice message, the audio editing method described in FIG. 3 is implemented. As a variant, step 33 of inserting a synthesized voice component with reference to FIG. 3 can also be implemented.

According to a particular embodiment of the disclosure, during the audio editing by a remote server or during the recording of a new voice component by the user, the new voice component can correspond to a predefined voice component. For example, the predefined voice component can correspond to a silence of a predetermined duration, a musical audio stream chosen as a function of the recipient or sender user, an advertising audio stream.

During the insertion of a predefined voice component, the server or the terminal implementing the method of modifying a voice message implements the step of updating the items of information associated with the voice components and the step of making available the modified voice message.

According to another particular embodiment of the disclosure, during the audio editing by a remote server, a sound noising, for example musical, may be affixed to the audio sequence of the voice message edited. The relative sound level of this noising must be of a level compatible with the sound level of the voices of the voice components of the message, so as not to interfere with them and so as not to disturb the understanding of the final message by the recipient. The relative sound level of this noising may be established as a function of parameters specific to the recipient, like his relative hearing level if this item of information is available and accessible or as a function of his age for example. The noising to be employed can for its part be chosen from a musical database, for which the operator of the method possesses the rights, or as a variant chosen by the sender, or as a function of the sender's or of the recipient's predefined preferences.

Figure 4:
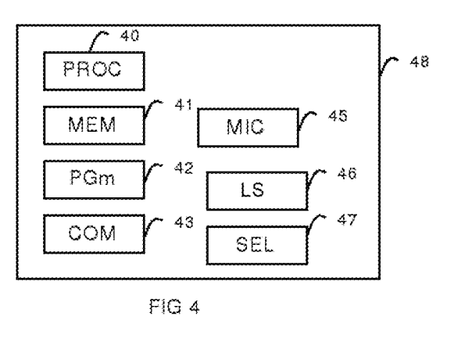
FIG. 4 shows the structure of a device implementing the method of modifying a compounded voice message according to a particular embodiment of the disclosure.

FIG. 4 shows the structure of a device 48 implementing the method of modifying a compounded voice message according to a particular embodiment of the disclosure, for example that described with reference to FIG. 1. The device comprises a memory 41 comprising a buffer memory (MEM), a processing unit 40, equipped for example with a processor (PROC), and driven by the computer program (PG) 42, implementing the method of modifying a compounded voice message.

On initialization, the code instructions of the computer program 42 are for example loaded into a RAM memory before being executed by the processor of the processing unit

40. The processor of the processing unit 40 implements the steps of the method of modifying a compounded voice message described previously comprising at least one first voice component according to the disclosure and notably the steps of obtaining at least one second voice component, of updating at least one item of information belonging to a group of items of information associated with the compounded voice message as a function of the at least one second voice component, and of making available the compounded voice message comprising the at least one first and second voice components, and the group of items of information associated with the compounded voice message, according to the instructions of the computer program 42.

Accordingly, the device comprises, in addition to the buffer memory 41, communication means (COM) 43. These communication means can for example correspond to a network interface allowing the device to connect to a communication network of Internet type or a mobile network or the like.

According to a particular embodiment of the disclosure, the device 48 also comprises acquisition means 45, such as for example a microphone (MIC), for acquiring a second voice component spoken by a user and means of sound restoration 46 of the voice message, such as for example a loudspeaker (LS) or a sound output making it possible to connect a headset.

According to another particular embodiment of the disclosure, the device 48 also comprises selection means 47 (SEL) allowing a user to select a position for inserting a voice component to be inserted into the voice message read. These selection means can correspond to the keys of a keyboard.

The device 48 can for example correspond to a mobile or fixed terminal, or a terminal of smartphone type (or intelligent telephone in English) or to a data processing server.

Figure 5:
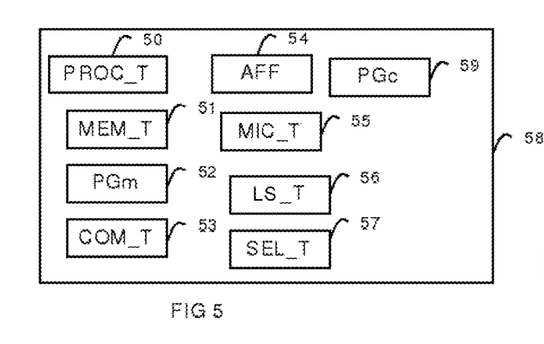
FIG. 5 shows the structure of a device implementing the method of consulting a compounded voice message according to a particular embodiment of the disclosure.

FIG. 5 shows the structure of a device 58 implementing the method of consulting a compounded voice message according to a particular embodiment of the disclosure, for example that described with reference to FIG. 2. The device comprises a memory 51 comprising a buffer memory (MEM_T), a processing unit 50, equipped for example with a processor (PROC_T), and driven by the computer program (PGc) 59, implementing the method of consulting a compounded voice message.

On initialization, the code instructions of the computer program 59 are for example loaded into a RAM memory before being executed by the processor of the processing unit 50. The processor of the processing unit 50 implements the steps of the method of consulting a compounded voice message according to the disclosure described previously and notably the steps of receiving at least one first voice component of the compounded voice message and the group of items of information associated with the compounded voice message and of restoration in a visual and/or voice form of the at least one first voice component as a function of the group of items of information associated with the compounded voice message, according to the instructions of the computer program 59.

Accordingly, the device comprises, in addition to the buffer memory 51, communication means (COM_T) 53. These communication means can for example correspond to a network interface allowing the device to connect to a communication network of Internet type or a mobile network or the like.

According to a particular embodiment of the disclosure, the device 58 also comprises means of sound restoration 56 of the voice message such as for example a loudspeaker (LS_T) or a sound output making it possible to connect a headset.

According to another particular embodiment of the disclosure, the device 58 also comprises display means 54 (AFF), such as for example a screen, making it possible to restore visually the compounded voice message and/or at least one item of information of the group of items of information associated with the compounded voice message.

According to another particular embodiment of the disclosure, the device 58 is also able to implement the method of modifying a compounded voice message for example such as described with reference to FIG. 1. Accordingly, the device 58 comprises a computer program (PGm) 52, implementing the method of modifying a compounded voice message.

On initialization, the code instructions of the computer program 52 are for example loaded into a RAM memory before being executed by the processor of the processing unit 50. The processor of the processing unit 50 implements the steps of the method of modifying a compounded voice message comprising at least one first voice component according to the disclosure described previously and notably the steps of obtaining at least one second voice component, of updating at least one item of information belonging to a group of items of information associated with the compounded voice message as a function of the at least one second voice component, and of making available the compounded voice message comprising the at least one first and second voice components, and the group of items of information associated with the compounded voice message, according to the instructions of the computer program 52.

According to this particular embodiment of the disclosure, the device 58 comprises acquisition means 55 such as for example a microphone (MIC_T) for acquiring a second voice component spoken by a user.

According to another particular embodiment of the disclosure, the device 58 also comprises selection means 57 (SEL_T) allowing a user to select a voice component to be played or select an action that can be executed defined as a function of at least one item of information associated with a voice component restored for example. These selection means can correspond to a pointing device, for example a mouse, or else to a touch interface of a screen.

The device 58 can for example correspond to a mobile or fixed terminal, or a terminal of smartphone type (or intelligent telephone in English).

Figure 6:
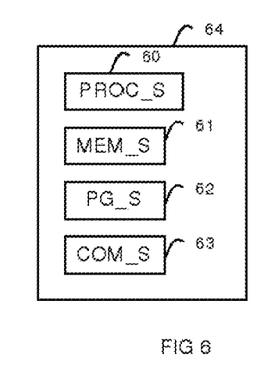
FIG. 6 shows the structure of a device implementing the method of editing a global voice message according to a particular embodiment of the disclosure.

FIG. 6 shows the structure of a device 64 implementing the method of editing a global voice message according to a particular embodiment of the disclosure, for example the method described with reference to FIG. 3.

The device comprises a memory 61 comprising a buffer memory (MEM_S), a processing unit 60, equipped for example with a processor (PROC_S), and driven by the computer program (PGmt) 62, implementing the method of editing a global voice message.

On initialization, the code instructions of the computer program 62 are for example loaded into a RAM memory before being executed by the processor of the processing unit 60. The processor of the processing unit 60 implements the steps of the method of editing a global voice message on the basis of a compounded voice message comprising at least one first and second voice components and a group of items of information associated with the compounded voice message, according to the disclosure described previously and notably the steps of reading the at least one first and second stored voice components and at least one item of information of the group of items of information associated with the compounded voice message, and of concatenating the at least one first and second voice components as a function of the at least one item of information read from the group of items of information associated with the compounded voice message, according to the instructions of the computer program 62.

Accordingly, the device comprises, in addition to the buffer memory 61, communication means (COM_S) 63. These communication means can for example correspond to a network interface allowing the device to connect to a communication network of Internet type or a mobile network or the like.

The device 64 can for example correspond to a data processing server or a voice messaging server.

Figure 7:
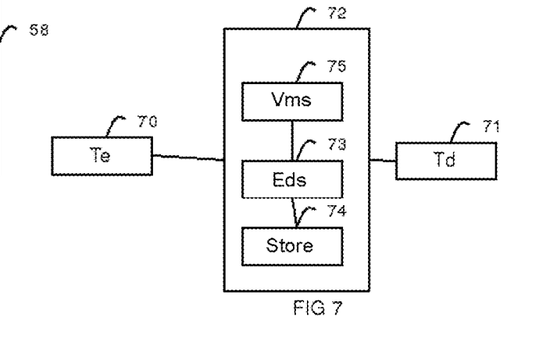
FIG. 7 shows an environment for implementing the methods of modifying a compounded voice message, of consulting a compounded voice message and of editing a global voice message.

FIG. 7 shows an environment for implementing the methods of modifying a compounded voice message, of consulting a compounded voice message and of editing a global voice message.

The terminal 70 (Te) can for example correspond to the terminal of a sender user implementing the method of modifying a compounded voice message such as described in FIG. 1. On receipt of a voice message, the user of the terminal 70 modifies this message for example by adding a voice component and dispatches it to the user of a terminal 71 (Td). While waiting for the user to consult the modified message, the compounded voice message is stored on a messaging system 72.

According to the embodiment, the messaging system can comprise a voice messaging server 75 (Vms) allowing a user to access the voice messages of which he is the recipient. The messaging server 75 can for example store an item of information indicating that a compounded voice message is stored for this recipient. The various voice components and the information group associated with the compounded voice message may be stored on a storage server 74 (Store) which the server 75 accesses when the terminal 71 dispatches a request to consult messages received.

The server 75 then transmits the compounded voice message to the terminal 71. The terminal 71 then implements the method of consulting a compounded voice message as described in the disclosure.

If the recipient's terminal 71 does not support the restoration of the compounded voice message in the form of independent voice sequences, the editing server 73 (Eds) of the messaging system 72 can on request perform an audio editing of a global voice message on the basis of the voice components and of the information group associated with the voice message according to the method described in FIG. 3 for example. The global voice message is thereafter transmitted to the recipient 71.

According to another embodiment, if the terminal 70 does not have the capabilities to support the method of modifying a voice message as described in the disclosure, this functionality may be proposed to the user of the terminal 70 by the messaging server 75 or a distinct server (not represented in FIG. 7) of the system 72. The messaging server 75 then implements the method of modification as described in the disclosure.

Although the present disclosure has been described with reference to one or more examples, workers skilled in the art will recognize that changes may be made in form and detail without departing from the scope of the disclosure and/or the appended claims.

The invention claimed is:

1. A method comprising:
consultation by a recipient user of a compounded voice message, wherein the compounded voice message comprises at least two voice components, wherein a group of items of information is distinct from and associated with the compounded voice message, and wherein consultation comprises the following acts implemented with a processor:
receiving by a terminal of the recipient user:
said compounded voice message, and
said group of items of information associated with the compounded voice message,
restoring, by said terminal of the recipient user, in a visual form the said compounded voice message with the aid of the received group of items of information associated with said compounded voice message, said compounded voice message being displayed in the form of a timeline composed of segments, each segment corresponding to a voice component of the compounded voice message or being displayed in the form of a list of independent audio sequences, each sequence corresponding to a voice component of the compounded voice message.

2. The method of consultation according to claim 1, wherein said group of items of information comprises at least an item of information of position of each voice component in the compounded voice message.

3. The method of consultation according to claim 1, in which the compounded voice message is received in the form of independent audio sequences.

4. The method of consultation according to claim 3, in which the items of information associated with the compounded voice message allow the terminal to determine the order in which to arrange the voice components of the compounded voice message.

5. The method of consultation according to claim 1, comprising an act of restoring in a visual form at least one item of information belonging to the received group of items of information associated with the compounded voice message and relating to a voice component of the compounded voice message.

6. The method of consultation according to claim 5, in which said item of information is visually restored when the user selects the voice component to which said item of information is associated.

7. The method of consultation according to claim 5, in which said item of information is visually restored at the moment of the voice restoration of the voice component to which said item of information is associated.

8. The method of consultation according to claim 5, in which, when said compounded voice message is displayed in the form of a timeline, said item of information visually restored is displayed above the segment corresponding to the voice component to which said item of information is associated.

9. The method of consultation according to claim 8, in which said item of information visually restored comprises a number of the sender of the voice component to which said item of information is associated, a duration of the voice component and a time-stamp of the voice component.

10. The method of consultation according to claim 5, comprising displaying at least one action that can be executed, the action that can be executed being defined as a function of the at least one item of information associated with a voice component that is restored and belonging to the group of items of information associated with the compounded voice message.

11. The method of consultation according to claim 10, in which, when said compounded voice message is displayed in the form of a list of independent audio sequences, each item of information and each action associated with a voice component are displayed on the right of the audio sequence corresponding to the voice component to which the item of information is associated, and global items of information associated with the compounded voice message are displayed on the top of the list of independent audio sequences.

12. The method of consultation according to claim 1, wherein said item of information associated with a voice component from said compounded voice message belongs to a group consisting of:
- an item of information of position of the respective voice component in the compounded voice message,
- an item of information of duration of the respective voice component,
- at least one item of information relating to the sender user who emitted the respective voice component,
- the textual transcription of the respective voice component,
- a time-stamping item of information relating to the respective voice component.

13. The method of consultation according to claim 1, comprising:
- an acts of acquiring of a new voice component,
- an act of updating said group of items of information associated with the compounded voice message, and
- an act of making available to at least one recipient user:
    - the compounded voice message comprising the voice components received and the new voice component; and
    - the updated group of items of information.

14. A terminal for consulting a compounded voice message, wherein, the compounded voice message comprises at least two voice components, wherein a group of items of information is distinct from and associated with the compounded voice message and wherein the terminal comprises:
- means for receiving:
    - said compounded voice message, and
    - said group of items of information associated with the compounded voice message,
- means for restoring in a visual form said compounded voice message with the aid of the received group of items of information associated with said compounded voice message, said compounded voice message being displayed in the form of a timeline composed of segments, each segment corresponding to a voice component of the compounded voice message or being displayed in the form of a list of independent audio sequences, each sequence corresponding to a voice component of the compounded voice message.

15. The terminal for consulting a visual voice message according to claim 14, comprising means for restoring in a visual form at least one item of information belonging to the received group of items of information associated with the compounded voice message and relating to a voice component of the compounded voice message.

16. A non-transitory computer-readable medium comprising a computer program recorded thereon and comprising instructions for execution of a method of consultation by a recipient user of a compounded voice message, wherein the compounded voice message comprises at least two voice components, wherein a group of items of information is distinct from and associated with the compounded voice message, when the program is executed by a processor, wherein the method comprises the following acts implemented by the processor:
- receiving:
    - said the compounded voice message, and
    - said group of items of information associated with the compounded voice message,
- restoring in a visual form said compounded voice message with the aid of the received group of items of information associated with said compounded voice message, said compounded voice message being displayed in the form of a timeline composed of segments, each segment corresponding to a voice component of the compounded voice message or being displayed in the form of a list of independent audio sequences, each sequence corresponding to a voice component of the compounded voice message.

* * * * *